July 7, 1953   J. M. MILLER   2,644,460
PEANUT VINE STACKING POLE
Filed Aug. 8, 1950
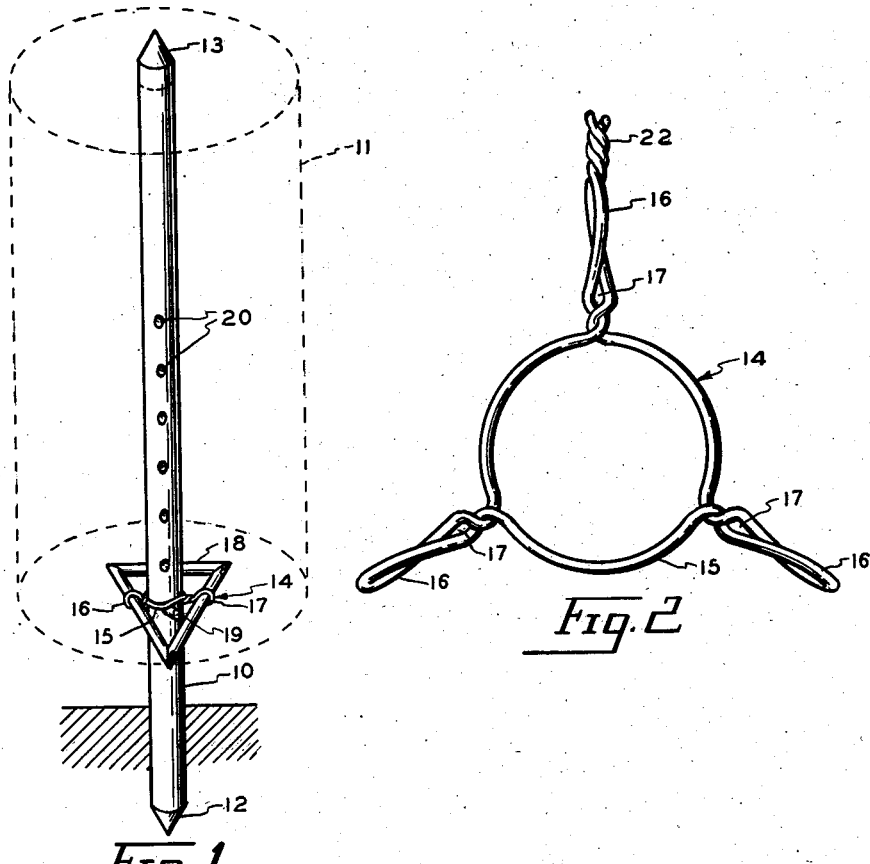
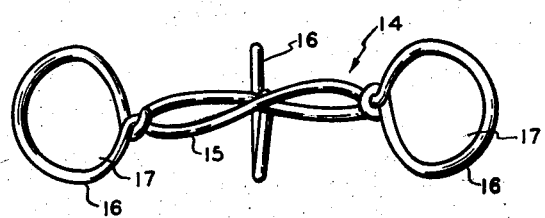
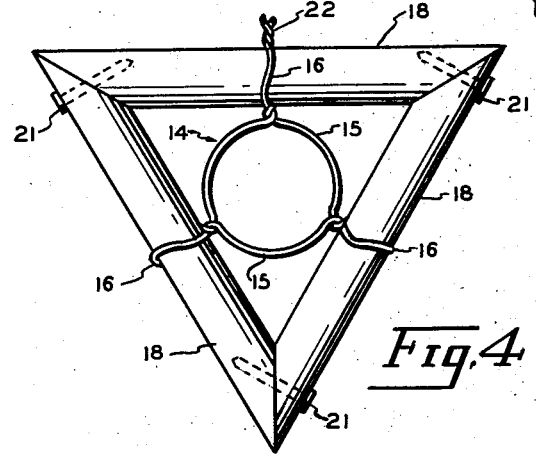
INVENTOR.
JACK M. MILLER
BY
John B. Armentrout Patented July 7, 1953

2,644,460

UNITED STATES PATENT OFFICE 2,644,460

PEANUT VINE STACKING POLE

Jack M. Miller, Carrollton, Va.

Application August 8, 1950, Serial No. 178,305

2 Claims. (Cl. 130—20)

This invention relates to supports and more particularly to devices for use in supporting soil-products for drying.

An object of the present invention is the provision of a simple and practical device for supporting harvested and stacked soil-products, such as peanut vines and the seeds thereon, for drying and curing.

Another object of this invention is the provision of an inexpensive and highly satisfactory stacking device for harvested plants or growths, which is easy to produce and use.

A further object of this invention is the provision of a simple outdoor stacking device for curing harvested soil-products.

A still further object is that of providing a practical and inexpensive mounting component of a stacking device of the character indicated.

Other objects of this invention in part will be obvious and in part pointed out more fully hereinafter.

The invention accordingly consists in the features of components and combination of elements described herein, the scope of the application of which is indicated in the following claims.

As conducive to a clearer understanding of certain features of the present invention, it may be noted at this point that stackers or driers of the character indicated are employed for such purposes as curing harvested crops, for example peanut vines, clover, beans, alfalfa, or the like. The harvested products are supported substantially free of contact with the ground, this being preferred for assuring better ventilation of the stacks and to prevent mildew and deterioration as the result of dampness or rain. In way of further example the stacking devices are useful for such purposes as drying hay before the removal of seed, thus to give the seed an opportunity to cure and the remainder of the growth to dry for use as a by-product. In other instances it is the hay free of seed which is subjected to drying and curing while stacked on the devices.

In the accompanying drawing representing a preferred embodiment of the present invention:

Figure 1 is a side elevation of a stacking device and further depicts in dotted lines a stack of growth such as peanut vines supported on the device for drying;

Figure 2 is a plan view of a mounting forming a component of the device in Figure 1;

Figure 3 is a side elevation of the mounting represented in Figure 2; and

Figure 4 is a plan view corresponding to Figure 2, and also representing additional elements of the growth stacking device.

Referring now more particularly to the embodiment of the invention represented in the drawing, the growth stacking device comprises a post 10 to be inserted substantially centrally into a stack of growth 11, and the post has a lower end 12 for sticking into the ground for occupying a vertical position. The lower end 12 of the post preferably is a sharp or pointed end to facilitate insertion in the earth. An upper end 13 of the post usually is made pointed so that the growth stack may be readily formed by piling the harvested material down over this pointed end once the lower end 12 has been pushed or driven into the earth. The post 10 illustratively is made of wood, metal, synthetic resin, or the like, and in certain instances is of hollow construction for lightness and savings in materials.

To afford bottom support for the growth stack 11, a mounting 14 is employed on the post 10 of the stacking device. This mounting 14 is supported some distance above the ground on the post to hold the bottom of the stack substantially clear of the earth for better ventilation of the stacked material and so that moisture may promptly drain away to prevent mildew and deterioration. A central apertured portion 15 of the mounting 14 receives the post 10 longitudinally in the aperture thereof, and the mounting further includes a plurality of arms 16 peripherally spaced around the apertured portion 15 and extending outward from the latter. The arms 16 have openings 17, these openings giving paths through the arms in directions which are substantially lateral to the post 10. Oblong elements 18, such as bars or rods of wood, metal, synthetic resin, or the like, occupy longitudinal positions through the openings 17 and are disposed substantially lateral to the post 10, thus to be supported by the arms 16 and to afford bottom support for the growth stack 11.

Apertured portion 15 of the mounting 14 preferably is slidable along the post 10 to a point of support to the latter, such as a point defined by a fastening 19 as in the form of a nail secured to the post and serving to stop further lowering of the mounting 14. By making the mounting slidable on the post it is possible to select any of a number of heights of support of the growth stack 11 from the earth or to alter the available length of the post 10 which may be driven into the earth for vertical disposition of the post. If desired, the post 10 is provided with a plurality of vertically spaced openings 20 or the like for selectively receiving the fastening 19 for change of height of support of the mounting 14 to the post.

In preferred embodiment the mounting 14 is made of wire forming a closed figure giving the substantially central apertured body portion 15 and twisted at intervals along the periphery of the closed figure to afford a plurality of arms in the form of loops. The closed wire figure for example is readily made from a single strand of wire having its ends twisted together as at 22 to produce the closed configuration. It is but a simple matter then to form the arms 16 by twisting out loops at appropriate points along the length of the closed wire figure. As a result of forming the arms or loops 16, the central apertured body portion 15 is also formed.

In certain instances the growth stacking device, and more particularly the mounting 14, is so constructed (see Figure 4) as to enable intersection of the oblong elements 18. The intersecting portions of the oblong elements 18 illustratively are secured together by fastening means such as nails 21, wire or string. To enable intersection of the oblong elements, arms 16 and the openings 17 therethrough conveniently are so disposed and directed as to admit the oblong elements to intersecting positions. A very simple arrangement in accordance with the present invention results from the use of three oblong elements 18 in triangular disposition (see especially Figure 4) to achieve intersection with each other by individually extending through a different one of three arms 16. The fastening means 21 in the particular instance just referred to holds the oblong elements 18 together while these same oblong elements are arrested against any substantial amount of longitudinal movement by the arms 16.

While at present it is preferred to make the mounting 14 of wire, such as plain wire or wire of the coated type wherein for example the coating is corrosion resistant, it will be distinctly understood that at times the mounting is otherwise constructed in accordance with the present invention, illustratively by forming the mounting of porcelain, or by molding or casting the same of a plastic material such as metal, a thermoplastic synthetic resin, or the like, to produce the central apertured portion and arms integral with the apertured portion for the purpose or purposes described.

As many possible embodiments may be made of the invention and as many changes may be made in the embodiment hereinbefore set forth, it will be understood that all matter described herein is to be interpreted as illustrative and not as a limitation.

I claim:

1. A stacking device for supporting harvested growth such as vines or the like, comprising a post having a stop, a supporting unit slidably mounted on the post and engaging said stop, said unit comprising a central ring having an opening surrounding the post and at least three vertical rings equally spaced about the outer side of the central ring and each disposed in plane approximately normal to the plane of the central ring, and a rigid bar extending through each of said vertical rings and extending substantially to the point of intersection with adjacent bars to form a polygonal platform, said rings and bars being secured to form a stable unit.

2. The structure defined in claim 1, wherein said central ring and vertical rings are embodied in a closed wire figure including at least three spaced loops immediately outside said central ring, resulting from said wire being twisted at spaced intervals.

JACK M. MILLER.

References Cited in the file of this patent

UNITED STATES PATENTS

| Number | Name | Date |
|---|---|---|
| 120,719 | Couty | Nov. 7, 1871 |
| 542,556 | Drum | July 9, 1895 |
| 677,797 | Reissmann | July 2, 1901 |
| 730,779 | Lacy | June 9, 1903 |
| 1,287,554 | Wolfe | Dec. 10, 1918 |
| 1,466,191 | Roos | Aug. 28, 1923 |
| 1,684,340 | Berke | Sept. 11, 1928 |
| 2,130,961 | Leggett | Sept. 20, 1938 |
| 2,304,695 | Kite | Dec. 8, 1942 |